United States Patent [19]

Andrews, Jr.

[11] Patent Number: 5,808,580
[45] Date of Patent: Sep. 15, 1998

[54] RADAR/SONAR SYSTEM CONCEPT FOR EXTENDED RANGE-DOPPLER COVERAGE

[76] Inventor: Grealie A. Andrews, Jr., 5 Elk La., Palmyra, Va. 22963

[21] Appl. No.: 796,749

[22] Filed: Feb. 6, 1997

[51] Int. Cl.$^6$ .......................... G01S 13/90; G01S 13/526; G01S 15/52

[52] U.S. Cl. .......................... 342/162; 342/99; 342/108; 342/115; 342/145; 342/189; 342/202; 342/203; 342/197; 342/25; 367/90; 367/100; 367/103

[58] Field of Search .................................. 342/162, 161, 342/99, 108, 112, 115, 137, 145, 189, 25, 194, 195, 201, 202, 203, 204; 367/88, 90, 91, 94, 99, 100, 103

[56] References Cited

U.S. PATENT DOCUMENTS

| H767 | 4/1990 | Kretschmer, Jr. et al. .............. 342/145 |
|---|---|---|
| 3,631,490 | 12/1971 | Palmieri . |
| 4,040,057 | 8/1977 | Cross et al. . |
| 4,106,019 | 8/1978 | Alexander et al. . |
| 4,328,495 | 5/1982 | Thue ....................................... 342/109 |
| 4,353,067 | 10/1982 | Mims ....................................... 342/201 |
| 4,566,010 | 1/1986 | Collins ..................................... 341/201 |
| 4,602,258 | 7/1986 | Sarfati . |
| 4,727,375 | 2/1988 | Lacomme . |
| 4,730,189 | 3/1988 | Siegel et al. . |
| 4,746,922 | 5/1988 | Prenat . |
| 4,924,231 | 5/1990 | Prenat . |
| 4,933,914 | 6/1990 | Feintuch et al. ........................... 367/87 |
| 5,047,784 | 9/1991 | Gerlach et al. ........................... 342/201 |
| 5,151,702 | 9/1992 | Urkowitz ................................. 342/134 |
| 5,173,706 | 12/1992 | Urkowitz ................................. 342/99 |
| 5,293,168 | 3/1994 | Faulkner . |
| 5,442,359 | 8/1995 | Rubin . |

OTHER PUBLICATIONS

Andrews, G.A. and S.L. Sheller, A Matched Filter Doppler Processor for Airborne Radar, Jul. 13, 1983, NRL Report 8700, Naval Research Laboratory, Washington, D.C.

Arcasoy, C.C. and B. Koc, "On Cross–Ambiguity Properties of Welch–Costas Arrays," pp. 1063–1071, IEEE Transactions on Aerospace and Electronic Systems, vol. 30, No. 4, Oct. 1994.

Costas, John P., "A Study of a Class of Detection Waveforms Having Nearly Ideal Range–Doppler Ambiguity Properties," pp. 996–1009, Proceedings of the IEEE, vol. 71, No. 8, Aug. 1984.

Drumheller, David Mark and Edward L. Titlebaum, "Cross-–Correlation Properties of Algebraically Constructed Costas Arrays," pp. 2–10, IEEE Transactions on Aerospace and Electronic Systems, vol. 27, No. 1, jan. 1991.

Freedman, Avraham, and Nadav Levanon, "Staggered Costas Signals," pp. 695–702, IEEE Transactions on Aerospace and Electronic Systems, vol. AES–22, No. 6, Nov. 1986.

Golomb, Solomon W., and Herbert Taylor, "Construction and Properties of Costas Arrays," pp. 1143–1163, Proceedings of the IEEE, vol. 72, No. 9, Sep. 1984.

Levanon, Nadav, "Coded Radar Signals," pp. 145–165, *Radar Principles,* John Wiley & Sons, 1988.

Long, William H., David H. Mooney and William A. Skiltman, "Pulse Doppler Radar," Chap. 17, pp. 17.1–17.42, Radar Handbook.

Correspondence–"Costas Arrays with Small Number of Cross–Coincidences," pp. 109–113, IEEE transactions on Aerospace and Electronic Systems, vol. AES–25, No. 1, Jan. 1989.

*Primary Examiner*—John B. Sotomayor
*Attorney, Agent, or Firm*—Hoffman, Wasson & Gitler

[57] ABSTRACT

A method and apparatus for preventing the occurrence of range ambiguities and Doppler ambiguities in both a radar and sonar environment. A series of N pulses are produced, each of which contains a number of contagious subpulses. Each of the subpulses exhibit a different frequency than the remaining subpulses in that particular pulse. Furthermore, the order of appearance of the subpulses in each of the pulses is unique with respect to the remaining pulses in the series. A matched filter receiver and Doppler processor are used to provide auto correlations and cross correlations to prevent the range ambiguities and Doppler ambiguities.

46 Claims, 9 Drawing Sheets

FIG. 4 A COHERENT FREQUENCY CODE GENERATOR

FIG. 5 TIMING PULSES GENERATOR

FIG. 9 COSTAS CODE WAVEFORM "MISMATCHED" FILTER OUTPUT

Code length = 10
Doppler Shift = 0
Ave.Sidelobes, dB = -30.6
Peak Sidelobe, dB = -17.4
Sidelobe Weighting, dB = -40
S/N Loss, dB = -1.2

FIG. 10 PHASE-CODE SUB-PULSE MODULATOR

RADAR/SONAR SYSTEM CONCEPT FOR EXTENDED RANGE-DOPPLER COVERAGE

FIELD OF THE INVENTION

This invention is a waveform/signal-processing concept that eliminates the range and Doppler ambiguities of a radar or sonar system by a factor related to the time-bandwidth product of the transmitted waveform. The measurement of the range to a target is accomplished by measuring the time delay between each transmitted pulse and the arrival of echoes from the target. Velocity measurement is computed from the change in phase of the echoes from pulse to pulse, i.e. the target's Doppler shift. Ambiguities result in one or both of these measurements depending on the pulse repetition frequency (PRF) of the radar or sonar.

BACKGROUND OF THE INVENTION

Although the present invention can be applied to both radar and sonar tracking systems, for ease of explanation, the present invention will be described with respect to a radar system.

A fundamental decision in the design of radar systems is the selection of the PRF or its reciprocal, the pulse repetition interval (PRI). This decision will affect range and/or Doppler ambiguities which in turn will affect such capabilities as (a) the radar location and tracking of targets, (b) the necessary clutter rejection for search and tracking radars, and (c) the cross-range resolution and/or swath width of synthetic aperture radars (SAR). The selection of the PRF would classify the system as being a low PRF radar system, a medium PRF system or a high PRF system.

A low PRF radar is defined as a radar with the PRF low enough that the first range ambiguity is greater than the maximum anticipated target detection range, thereby resulting in no range ambiguities. A low PRF is generally selected for long range search applications which are most concerned with maximum volume surveillance. Tracking is a secondary capability that is usually accomplished with scan-to-scan measurements of the target location. Velocity is not measured directly but may be computed from a change in the target location from scan to scan. Target tracking is limited in a dense target scenario or highly maneuvering targets because of the relatively slow measurements of velocity and poor angular resolution. Moving target indicators (MTI) and coherent integration are usually employed for moving target detection and clutter rejection.

A high PRF radar is defined as a radar with the PRF high enough that the first Doppler ambiguity is greater than the Doppler shift of the maximum anticipated target velocity, thereby producing no Doppler/velocity ambiguities. A high PRF is generally selected for applications such as airborne intercept radars and shorter range tracking and weapon control radars that are most concerned with target velocity and high speed maneuvering targets. Target range is usually computed after detection using staggered PRFs and algorithms such as "the Chinese remainder theorem". Target tracking is limited for these radars in a dense target scenario or highly maneuvering targets because of the limitations of the algorithms for resolving target range ambiguities. These features are described in Chapter 17 of Radar Handbook 2nd Edition (M. I. Skolnik, ed.) entitled "Pulse Doppler Radar", authored by W. H. Long, N. H. Mooney.

With a high PRF, the velocity resolution, the target signal to noise ratio (SNR), and clutter rejection are also indirectly affected by the need to resolve range ambiguities. The algorithms for resolving range ambiguities require several target detections at different PRFs during an antenna dwell. This means that all the returns cannot be coherently integrated to give the maximum velocity resolution, maximum SNR, or maximum clutter rejection. An additional concern of these radars is that the clutter rejection needs are increased. Because of range ambiguities, the clutter folds over in range, increasing the clutter level in each range cell and also causing close-in, high-level clutter to interfere with the detection of long-range, low-level targets. Therefore, a higher level of clutter rejection is usually needed.

A medium PRF radar is defined as a radar with the PRF not high enough for the first Doppler ambiguity to be greater than the Doppler shift of the maximum anticipated target velocity, thereby resulting in Doppler/velocity ambiguities. At the same time, the PRF is not low enough for the first range ambiguity to be greater than the maximum anticipated target detection range, thereby resulting in range ambiguities. When a medium PRF is used, both range and Doppler ambiguities must be resolved. Since there are fewer range ambiguities than with a high PRF and fewer Doppler ambiguities than with a low PRF, the impact of each of these ambiguities and the complexity of resolving them are reduced.

An imaging synthetic aperture radar (SAR) is a unique application that cannot tolerate either range or Doppler ambiguities. After the antenna aperture size, the transmit frequency, and the platform velocity are selected, the Doppler spectral spread across the antenna pattern due the platform velocity is determined by the values selected for those parameters. The PRF must be at least two times the Doppler spread to prevent Doppler ambiguities in the image. Usually an even higher PRF is selected to prevent returns from the skirts of the antenna pattern from folding over into the image. The resulting PRF then determines the maximum range, or swath width, of the imaged area. This swath width is usually considerable less than desirable for the efficient and economical utilization of the radar and its platform.

From the above, it is seen that, for most applications, targets or scatterers cannot be located or tracked in both range and velocity without ambiguities. An exception is the SAR which is resigned to a very small swath width of coverage to prevent ambiguities. A number of techniques are available to resolve the ambiguities by transmitting several bursts with different PRFs and/or frequencies during an antenna dwell time. These techniques are limited in the number of targets that can be handled simultaneously as well as losses in signal-to-noise ratio and clutter rejection.

The problem of eliminating both range and Doppler/velocity ambiguities has been recognized by practitioners in the radar field for many years. One method for resolving this situation would be the utilization of a changing waveform. For example, U.S. Pat. No. 4,746,922 issued to Prenat includes a transmitter circuit producing pulses at different repetition frequencies (PRFs). A receiver circuit would receive echo signals which are filtered so as to eliminate those signals due to fixed targets and then apply the remaining signals to a bank of frequency filters with the required phase corrections to compensate for the different PRFs. Therefore, an echo signal will only be produced from the frequency filter corresponding to its associated Doppler frequency. Because of the ambiguity in the measurement of the Doppler frequency, the tuned frequencies of these filters are all less than the minimum PRF of the transmitted pulses.

Additionally, U.S. Pat. No. 4,106,019 issued to Alexander et al describes a system for measuring unambiguous target range for high velocity targets. Target range and Doppler frequency data from three sequential transmission dwells of radar returns are stored, each dwell having a different PRF. A correlation unit is included which would insure that the velocity of the target satisfies a 17 path algorithm across three adjacent dwells in at least one of five range azimuth profiles or paths.

Finally, U.S. Pat. No. 5,442,359 issued to Rubin illustrates a method of resolving Doppler frequency shift ambiguities modulated with a periodic waveform having a plurality of pulses with a period having an unequal interpulse interval (PRI).

Other current techniques are aimed at resolving the ambiguities using post detection techniques such as target tracking to estimate the velocity for low-PRF, Doppler ambiguous waveforms and multiple PRFs with algorithms such as the "Chinese remainder theorem" to resolve range ambiguities of high-PRF waveforms.

SUMMARY OF THE INVENTION

The present invention overcomes the deficiencies of the prior art by providing method of and operation for preventing range ambiguities and Doppler shift ambiguities from occurring in pulse Doppler radar systems within a selected maximum range and maximum Doppler shift. A waveform is utilized containing a train of frequency coded pulses whenever each pulse is separated from its neighboring pulse by the PRI of the waveform. Each of the pulses is made up of a burst of continuous wave (CW) (or alternatively phase coded)subpulses of varying frequency. For ease of understanding this invention, the first embodiment described will be the simplest embodiment in which the sub-pulses are CW pulses. Later, an embodiment with the sub-pulses phase coded will be described. Each of the pulses contains the same subpulse frequencies, but in varying order. A number of delays as well as correlators are utilized with a Fast Fourier Transfer to provide the proper output.

BRIEF DESCRIPTION OF DRAWINGS

The above mentioned and other objects and features of this invention and the manner of attaining them will become apparent, and the invention itself will be best understood by references to the following description of the embodiment of the invention in conjunction with the accompanying drawings, wherein.

DETAILED DESCRIPTION OF THE PREFERRED EMBODIMENTS

Current techniques generally require a sub-optimal processing scheme to resolve ambiguities that reduce the output SNR, the clutter rejection and the velocity/Doppler resolution. These techniques limit the number of targets that can be tracked simultaneously and a high cross-range resolution for SAR limits the swathwidth of coverage.

The present invention would allow a practitioner to select the PRF in a manner to prevent Doppler ambiguities for the maximum velocity of interest. The invention would also select the number of coded pulses to be used in the burst waveform so that the maximum range of interest is less than the first range ambiguity. Additionally, the present invention would utilize a wide bandwidth waveform to give good range resolution without prohibiting other similarly designed radars from using the same bandwidth as long as all the radars use different subsets of the available frequency hopping codes. Finally, the present invention would allow the design of an SAR with an antenna aperture size, transmit frequency, PRF and platform velocity to obtain the desired image resolution and then select the number of coded pulses to be used in the burst waveform to achieve the desired swathwidth of coverage.

Figure 1:
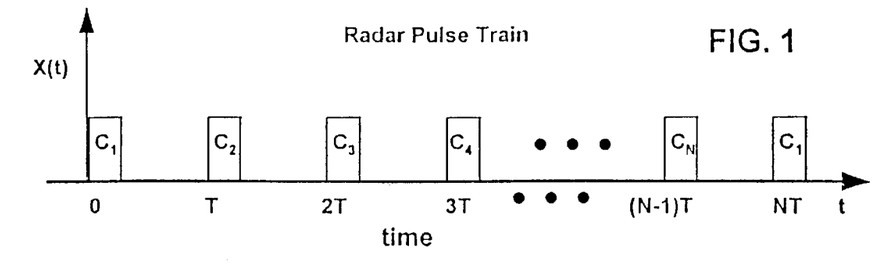
FIG. 1 is a radar wave form with each pulse coded with different frequency codes.
Figure 2:
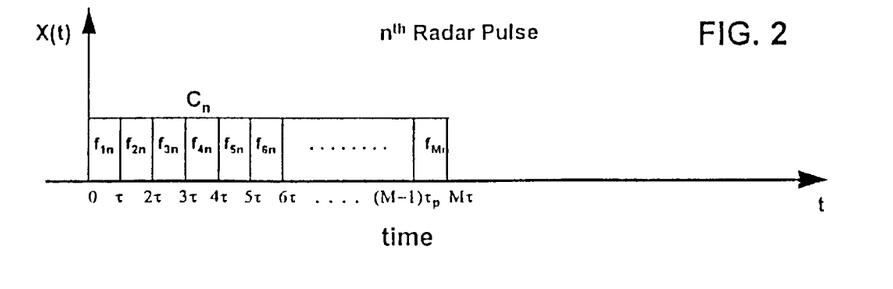
FIG. 2 is an illustration of one of the frequency coded pulses in the burst of FIG. 1.

A novel feature of the waveform/receiver design of the present invention would be that the ambiguities, both range and velocity, will be greater than the maximum range of interest and the maximum velocity of interest respectively with the proper selection of waveform parameters. This waveform, as shown in FIG. 1, consists of a train of frequency coded pulses where T is the PRI. The frequency codes, labeled $C_1$ to $C_N$, are different on each pulse up to the $N^{th}$ pulse. Each of the codes $C_1$ to $C_N$ are separated from adjacent codes by a quiescent interval. They are then repeated in bursts of N pulses per burst. Each of the N pulses are themselves made up of a burst of continuous wave (CW) subpulses as shown in FIG. 2 for M subpulses. The pulsewidth of each subpulse is $\tau_p$ and the total pulse width of the pulse is $M\tau_p$. The frequencies are labeled $f_{1n}$, $f_{2n}$, $f_{3n}$, etc. in the order of their appearance in the pulse. This labeling is not related to the particular value of that frequency component, i.e. the frequency, $f_{1n}$, is not necessarily greater than $f_{2n}$, and the frequency, $f_{2n}$, is not necessarily greater than $f_{3n}$, etc. The first subscript 1, 2, 3, . . . , M represents the location of that frequency in the nth code; n=1, 2, . . . , N.

The characteristics of this frequency coding are: (1) The subpulses are contiguous in time, i.e. no spaces between them. (2) The code of each pulse is a member of a set which contains the same frequency subpulses, only the order of appearance of each frequency is changed from pulse to pulse. (3) The frequency values for the subpulses of the codes are separated by $1/\tau_p$ where $\tau_p$ is the pulsewidth of the subpulses. (4) The codes have an ambiguity function (a two dimensional auto-correlation in time delay and Doppler shift) with a single peak at zero time delay and zero Doppler shift and with low sidelobes approaching 1/M for all other values outside the mainlobe. The Costas frequency hopped codes as described in "A Study of a Class of Detection Waveforms Having Nearly Ideal Range-Doppler Ambiguity Properties", appearing in Proceedings of the IEEE, Vol. 72, No. 8, (August 1984) authored by John P. Costas, meet these requirements. (5) The codes have a cross-ambiguity function (a two dimensional cross-correlation in time delay and Doppler shift) with no large peaks at any time delay or Doppler shift and with the peak values approaching 2/M. Certain of the Costas frequency hopped codes can be selected that meet these requirements.

Figure 3:
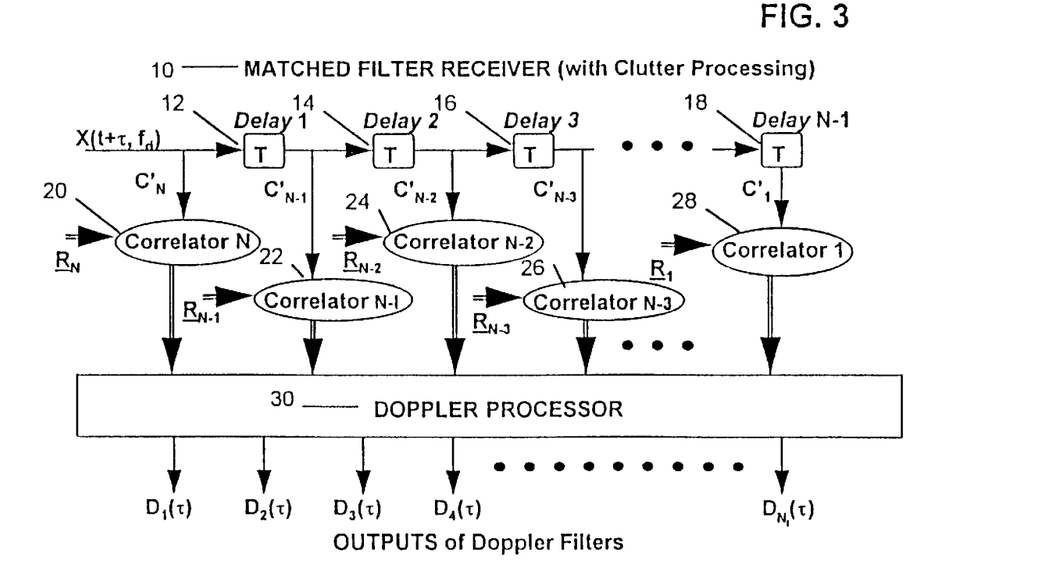
FIG. 3 is a matched filter receiver for the burst waveform shown in FIGS. 1 and 2.

The receiver for the present invention may be colocated with the transmitter or located at a location remote from said transmitter. A key component of this concept is that the receiver is implemented as a matched-filter for the entire N-pulse burst. A functional diagram of such a receiver 10 is shown in FIG. 3. The key components of this receiver are: (1) analog delay lines or digital storage devices 12, 14, 16 and 18, (2) correlators 20, 22, 24, 26, 28, and (3) a Doppler Processor 30 which in this figure is implemented with a properly weighted Discrete Fourier Transform (DFT) or an FFT. These components are standard, currently available electronic devices. These three operations may be performed in any order that is convenient for the particular application and target scenario. For instance, in some applications it may be advantageous to do the correlations prior to the storage or delays. It is also important to note that one less delay line or digital storage device is employed than the number of pulses N. Additionally, the same number of correlators as N pulses are included.

In an analog receiver, the delays are analog delay lines whose delay time is equal to the PRI, T. In a digital implementation, the delays are digital storage (memory or shift registers) with a memory location for each range cell and the number of range cells is also determined by the PRI, T. The number of range cells is $MT/\tau_p$, where M is the code length in FIG. 2, T is the PRI, and $\tau_p$ is the sub-pulse width in FIG. 2.

The correlators of FIG. 3 would be implemented digitally for example with FFTs or as a stretch processor. It may be matched to maximize signal-to-noise or signal-to-clutter depending on the application. An implementation of a Doppler compensated correlator is described later. The function of these correlators is to correlate the returns from targets, labeled $C'_1$ to $C'_N$, with time delayed and Doppler shifted replicas, labeled $R_1$ to $R_N$, of the codes selected for the radar. The number of these correlators is equal to the number of PRIs over which it is desired to have no range ambiguities.

The Doppler Processor of FIG. 3 can be any processor that is designed to separate or reject target returns based on the doppler shift of the signals. Many of these processors can be implemented as FFTs with the input signal samples properly weighted. Specific radar Doppler processors currently in use include: (1) the airborne MTI (moving target indicator) cascaded with coherent integration filters (FFT), (2) the pulse doppler radar doppler processor which includes usually a mainbeam clutter filter followed by an FFT, (3) the cross-range (Doppler) processor of an imaging synthetic aperture radar, and (4) the mean velocity and velocity spread estimation processing of weather Doppler radars. The number of pulses processed in the Doppler processor, $N_I$, may be more or less than the number of codes, N, used for preventing range ambiguities. For most applications requiring high Doppler resolution or high clutter rejection, $N_I$ will be much greater than N. In this case, outputs from the correlators will be accumulated until $N_I$ are gathered. The key factor in this invention is that the phase shift from pulse to pulse is related to the Doppler shift of the target returns as it is with a radar waveform whose pulses remains unchanged from pulse to pulse. Therefore, the coding used in this invention does not destroy or obscure these phase shifts.

The Doppler Processor 30 would include weighting for clutter process or filter side lobe control, moving target indication, main beam clutter filter and zero Doppler filter, as well as Doppler compensation.

The matched filter receiver of FIG. 3 is shown at the point in time when the entire burst waveform has been received from a target and a match occurs. The operation of the matched filter receiver as the returns from each code is received can be described by noting that, when the waveform of FIG. 1 is transmitted and strikes a target, the signals reflected back to the radar are characterized by the same codes in the same order and separated by the same PRI, T. After a time, $\tau$ (the round trip propagation time to the target), the code, $C'_1$, is received first at the input of the matched filter receiver of FIG. 3. $C'_1$ is the received time delayed and Doppler shifted return from $C_1$. If this receiver is implemented digitally, the received signals are first sent through a quadrature detector and an analog-to-digital converter (A/D). A functional description of a digital implementation is presented herein to facilitate understanding of the invention.

The digitized $C'_1$ is put into the storage device 12 and saved for a time, T. It is also sent to the correlator 20 where a cross-correlation of $C'_1$ and $R_N$ occurs. $R_N$ is a time delayed and Doppler shifted replica of $C_N$. Since the cross-correlation of these two codes is minimal, property (5) above, only a small signal with a level of about 2/M will be sent to the Doppler Processor 30. At a time, T, later $C'_1$ is shifted to device 14 and also sent to the correlator 22 where a crosscorrelation of $C'_1$ and $R_{N-1}$ occurs. At the same time, the code, $C'_2$, is received from the target. The digitized $C'_2$ is put into the storage device labeled 12 and saved for a time, T. It is also sent to the correlator 20 where a cross-correlation of $C'_2$ and $R_N$ occurs. Since the cross-correlation of both these two sets of codes are minimal, property (5) above, only small signals with a level of about 2/M will again be sent to the Doppler Processor 30.

This process is repeated again after another time interval, T, later when the code, $C'_3$, is received from the target. $C'_2$ and $C'_1$ are shifted to storage device 14 and storage device 16 respectively. The digitized $C'_3$ is put into the storage device 12 and saved for a time, T. It is also sent to the correlator 20 where a cross-correlation of $C'_3$ and $R_N$ occurs. $C'_2$ is sent to the correlator 22 where a cross-correlation of $C'_2$ and $R_{N-1}$ occurs. $C'_1$ is sent to the correlator 24 where a cross-correlation of $C'_1$ and $R_{N-2}$ occurs. All these cross-correlations are minimal so that minimal signals with levels about 2/M are sent to the Doppler Processor 30.

On the $N-1^{th}$ repetition of the process, $C'_N$, is received from the target. $C'_{N-1}$, $C'_{N-2}$, to $C'_1$ are shifted to the next storage devices 14 to 18 respectively. The digitized $C'_N$ is put into the storage device 12 and saved for a time, T. It is also sent to the correlator 20 where an auto-correlation with $R_N$ occurs; $C'_{N-1}$ is sent to the correlator 22 where a auto-correlation with $R_{N-1}$ occurs; etc. Finally $C'_1$ is sent to the correlator 28 where a auto-correlation with $R_1$ occurs. The peaks of all of these auto-correlations are maximum so that maximum signals are sent to the Doppler Processor 30. The peaks occur at a time, $\tau+(N-1)T$, after the beginning of transmission of the burst of N codes. $\tau$ corresponds to the range to the target, i.e. range, $R=c\tau/2$, and c is the velocity of propagation. As the codes are propagated on through the matched filter, no other auto-correlations occur so that only one peak related to the range to the target occurs over the time period of the burst of codes, NT. Therefore the first range ambiguity occurs at R=cNT/2 instead of the usual R=cT/2 when identical pulses are transmitted with a PRI of T.

The range-Doppler coverage is increased by a factor of N if the first Doppler ambiguity occurs at the Doppler $f_d$=1/T. This occurs if the phase shift of the peaks of the auto-correlations of each pulse (or code) can be related to the change in range of the target from one pulse to the next. This can be accomplished (a) if each code consists of the same set of frequency components, only the order of their appearance in each code changes (property (2) above), (b) if all of these frequency components are coherent with each other, and (c) if they are generated by sufficiently stable oscillators so that they are coherent from pulse to pulse. A functional diagram of a method of generating these codes is shown in FIG. 4 for the purpose of understanding the characteristics of the waveform shown in FIG. 1 and 2.

Figure 4:
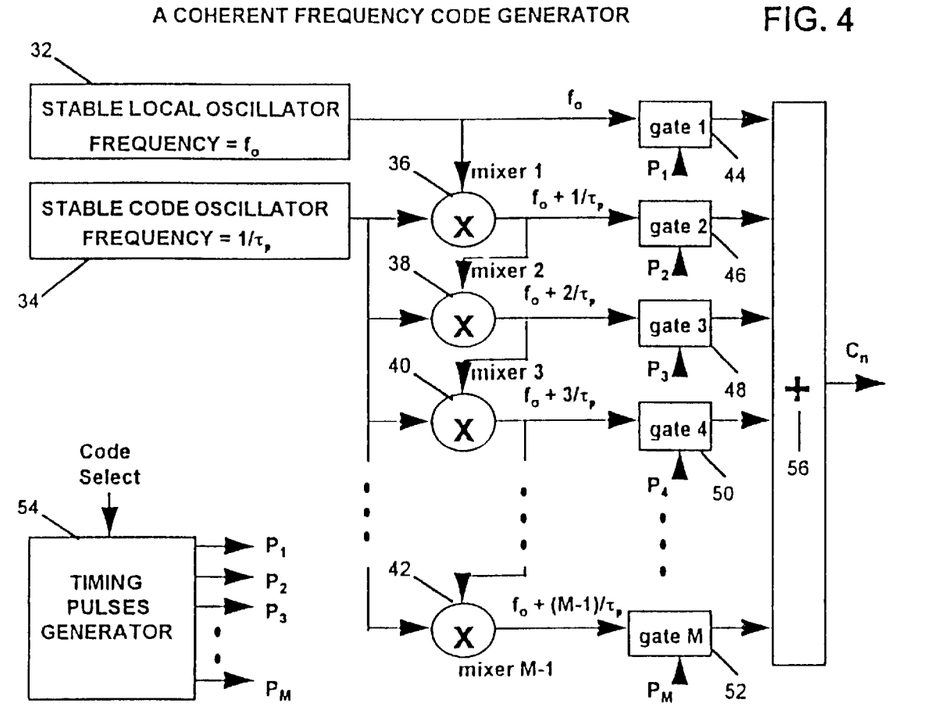
FIG. 4 is a functional diagram of an implementation of a frequency hopping code generator.

The nucleus of the implementation of FIG. 4 is two stable, coherent oscillators denoted as stable local oscillator 32 and stable code oscillator 34. The frequencies of the output sinusoidal signals are $f_o$ and $1/\tau_p$. $f_o$ is some convenient frequency such as the radar's local oscillator frequency. $1/\tau_p$ is the frequency separation of the subpulses of the code, property (3) above. When these two frequencies are input to mixers 36, 38, 40 and 42 in the manner shown, all the frequency components of a code of length M are generated coherently. These frequencies are labeled $f_o$, $f_o+1/\tau_p$, to $f_o+(M-1)/\tau_p$. The specific code can then be generated by gating on each of these frequencies one at a time at the proper time. This is accomplished by gates 44, 46, 48, 50 and 52. Gate 44 is directly connected to the stable local oscillator 32. Gates 46, 48, 50 and 52, are connected to the outputs of respective mixers 36, 38, 40 and 42. Each of these gates are turned on one at a time as determined by the timing pulses labeled $P_1$ through $P_M$. These timing pulses are generated by timing pulses generator 54 when the desired code is selected. The width of these timing pulses is $\tau_p$. Each of the resulting subpulses are combined to form the radar pulse with the desired code. The subpulses are combined in a summing device 56.

As described hereinabove, certain of the frequency hopping codes developed by John Costas properly selected have all the properties needed by this invention. A procedure for constructing these codes has been developed by Solomon Golomb and Herbert A. Taylor in an article entitled "Construction and Properties of Costas Arrays" appearing in the Proceeding of the IEEE, Vol. 72, No. 9, September 1984 and is incorporated by reference.

Figure 5:
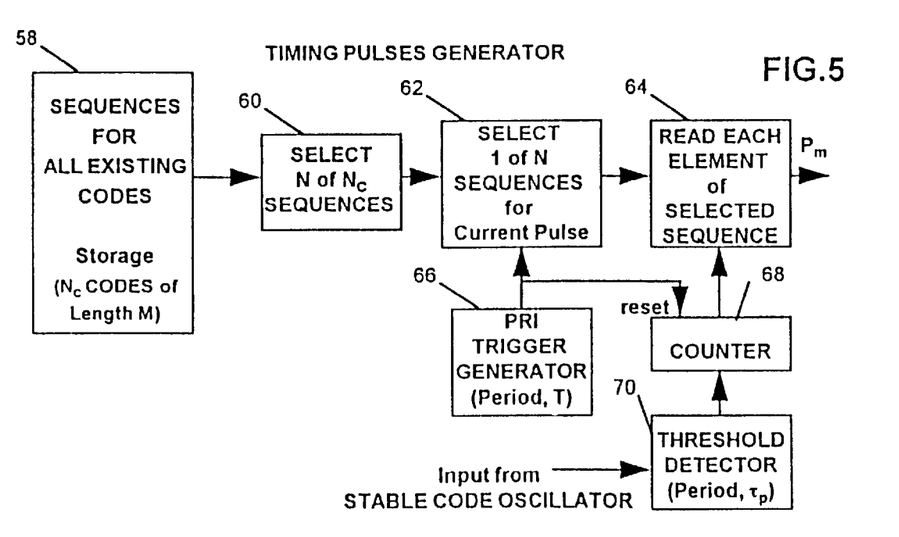
FIG. 5 is a functional diagram of an implementation of a timing pulses generator.

A functional diagram of an example of an implementation of the timing pulses generator is shown in FIG. 5, the components of which are currently available as digital hardware. An economical design would be to compute all the existing codes of the desired code length and store them for use when a subset is selected for radar operation. This would allow the subset to be changed if desired, for example when multiple radars are operating in near proximity. The number of codes in a set meeting the five properties described above is determined from the length of the code, M, which as shown before is the square root of the time-bandwidth product. For example, a total pulse-length of $M\tau_p$=120 ms and a bandwidth of $M/\tau_p$=30 MHz gives a time-bandwidth of $M^2$=3600 and a code length of M=60. Using a method described in "Cross-Correlation Properties of Algebraically Constructed Costas Arrays" authored by D. M. Drumheller and I. I. Titlebaum appearing in IEEE Transactions or Aerospace and Electronic Systems, Volume 27, No. 1, January 1991 , M=60 is an acceptable code length since M+1=61 must be a prime number and the number of codes using the Welch construction is $N_c$=960. Sixteen of these codes can be selected which have the required cross-correlation properties required for this invention. The teaching of this reference is also incorporated by reference. These code sequences are stored in the memory 58 in FIG. 5.

A subset, N, of the $N_c$ code sequences is selected for the radar operation and is stored in a separate memory location 60. At each PRI when a pulse is to transmitted, one of the N code sequences is selected using the same PRI trigger that is used to trigger a transmitter. This code sequence is placed into register 62. The PRI trigger generator 66 is a part of the usual radar timing circuitry. The output timing pulses, $P_m$, result from reading the sequence in register 62 one element at a time in order at each time interval, $\tau_p$, as shown in reference 64 of FIG. 5. The signal for 64 to advance to the next element of the code sequence is generated by a counter 68. The counter 68 advances each time interval, $\tau_p$, using a trigger generated by a threshold detector 70 with the output from the stable code oscillator 34 as its input. The threshold detector 70 generates the desired trigger to be counted each time interval, $\tau_p$. On the next PRI, another one of the N code sequences is selected, the counter 68 is reset and the next pulse with a different code is generated. After all N code sequences have been used, the first sequence is selected again and the cycle repeats.

Many applications using large time-bandwidth products and/or needing very high Doppler resolution not only may require compensation for the variation in Doppler across the bandwidth as does other wideband waveforms, but also will most likely require the phase "noise" caused by shifting the frequency components forward and backward in time from pulse to pulse, i.e. code to code to be compensated. An example of an implementation of such a receiver follows.

The transmitted signal is a set of N orthogonal codes such as Costas codes transmitted sequentially with a pulse repetition interval, T, as shown in FIG. 1. Here an orthogonal code waveform is defined as a waveform (a) whose normalized cross-correlation with a time-delayed, Doppler-shifted replica has a single peak of M at zero time delay and zero Doppler shift, and in regions outside the vicinity of this peak has a nominal normalized level of one and (b) whose normalized cross-correlation with different codes have no peaks. The $n^{th}$ code of this sequence is illustrated in FIG. 2. The transmitted sequence can be expressed mathematically, $$X_T(t) = \sum_{n=1}^{N} \sum_{m=1}^{M} e^{j2\pi f_{mn} t}(u(t-(n-1)T-(m-1)\tau_p) - u(t-(n-1)T-m\tau_p)) \quad (1)$$

where $$f_{mn} = f_T + \frac{l_{mn}-1}{\tau_p} \quad (2)$$

which has shifted the local oscillator frequency, $f_o$, to the transmit frequency, $f_T$. $l_{mn}$ is an integer between 1 and M that represents the difference frequency for the $m^{th}$ sub-pulse of the $n^{th}$ code or pulse. Thus, the parameter, $l_{mn}$, defines the code.

If at t=0, the waveform described by Equation (1) is transmitted, it strikes a target at range, R, that is traveling with a velocity whose radial component is $V_R$. The range is R=c$\tau$/2, with c being the propagation velocity and $\tau$ the time to the target and back. Therefore at a time, $\tau$, later, the received waveform from a point target is $$X_R(t) = X_T(t)|t \to t-\tau, f_{mn} \to f_{mn}+d_{mn}$$

where $d_{mn}$ is the Doppler shift of the $m^{th}$ frequency component of the $n^{th}$ code, or pulse, i.e. $d_{mn} = 2V_R/c \, f_{mn}$. The received signal is $$X_R(t) = \sum_{n=1}^{N} \sum_{m=1}^{M} e^{j2\pi(f_{mn}+d_{mn})(t-\tau)}(u(t-\tau-(n-1)T- \quad (3)$$

$$(m-1)\tau_p) - u(t-\tau-(n-1)T-m\tau_p))$$

A matched filter receiver will compensate for the Doppler spread across the waveform bandwidth as well as the phase "noise" caused by shifting the frequency components forward and backward in time from pulse to pulse, i.e. code to code. Such a matched filter has an impulse response that is the complex conjugate of received waveform of Equation (3). The transmit frequency is removed in the front end of the usual radar receiver using quadrature (I,Q) detection and the resulting baseband signal is sampled and digitized using analog-to-digital (A/D) converters. Mathematically the quadrature detection is represented by substituting Equation (2) into Equation (3) and multiplying by $e^{-j2\pi f_T t}$. Complex samples are taken at a sampling frequency equal to the bandwidth of the waveform, $M/\tau_p$, and A/D converted. This is represented mathematically by the sampling function $$\sum_{i=1}^{M^2} \delta\left(t - \tau - (i-1)\frac{\tau_p}{M}\right)$$

for each pulse (code), where $\delta$ is the unit impulse function. Using the selection operation of the unit step functions of Equation (3), this sampling function for each subpulse becomes $$\sum_{i=1}^{M} \delta\left(t - \tau - (n-1)T - (m-1)\tau_p - (i-1)\frac{\tau_p}{M}\right).$$

Therefore after quadrature detection and sampling the received signal becomes $$X'_R(t) = e^{-j2\pi f_T \tau} \sum_{n=1}^{N} \sum_{m=1}^{M} \sum_{i=1}^{M} e^{j2\pi(d_{mn}+\frac{l_{mn}-1}{\tau_p})(t-\tau)} \delta\left(\left(t-\tau- \quad (4)\right.\right.$$

$$\left.\left.(n-1)T - (m-1)\tau_p - (i-1)\frac{\tau_p}{M}\right)\right)$$

The amplitude quantization of the A/D converter is ignored in the mathematics since it does not affect the structure of the receiver other than allowing the remaining operations to be performed digitally.

The exponential in front of the summations is simply the phase shift of the transmit frequency due to the propagation time out to the target and back. It does not affect the structure of the receiver nor the magnitude of the receiver output. Therefore it can be dropped from further consideration.

Figure 6A:
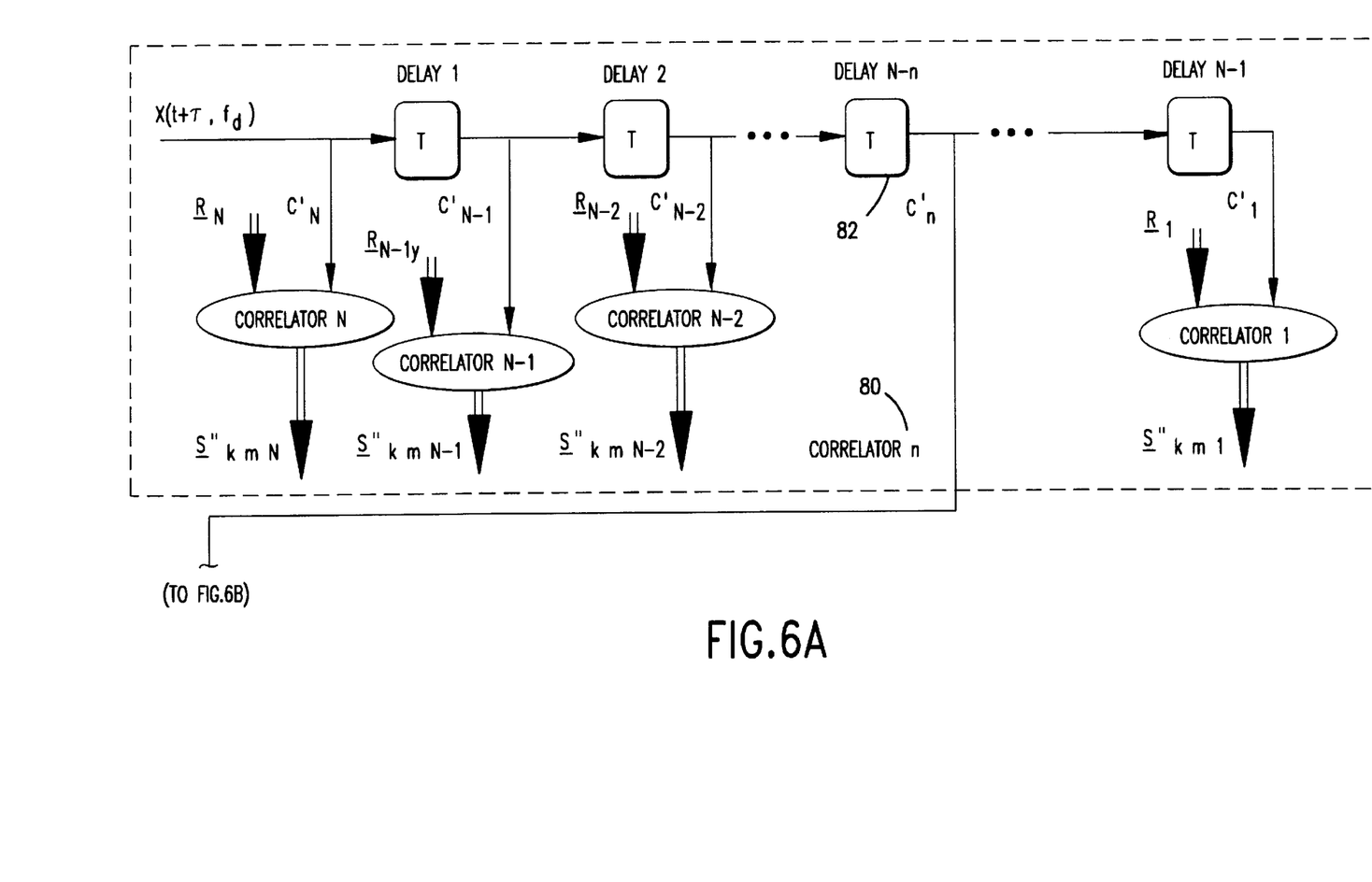
FIGS. 6A, 6B and 6C are functional diagrams of an implementation of Doppler compensation for the receiver shown in FIG. 3 with the $n^{th}$ correlation shown in detail.
Figure 6B:
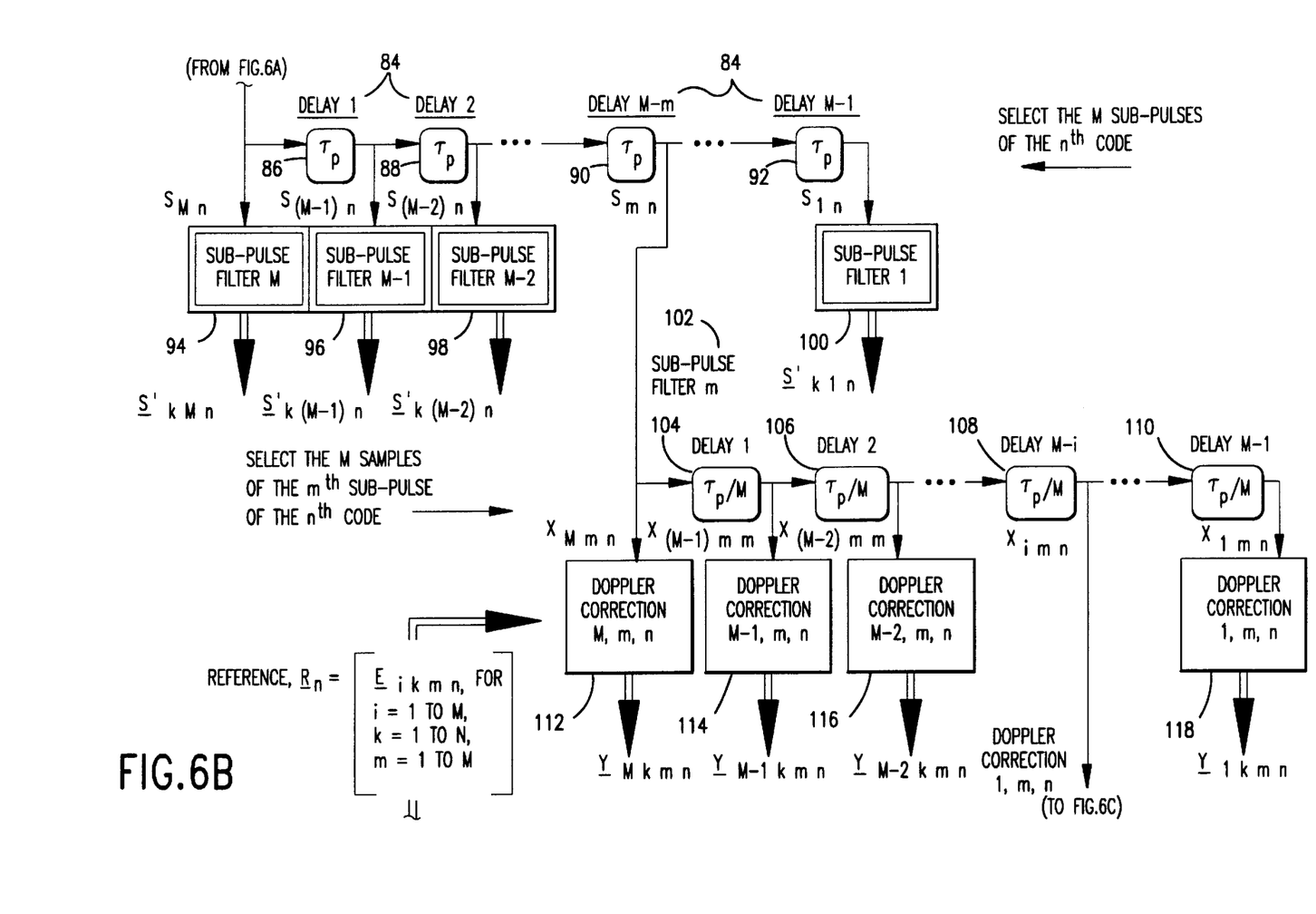
Figure 6C:
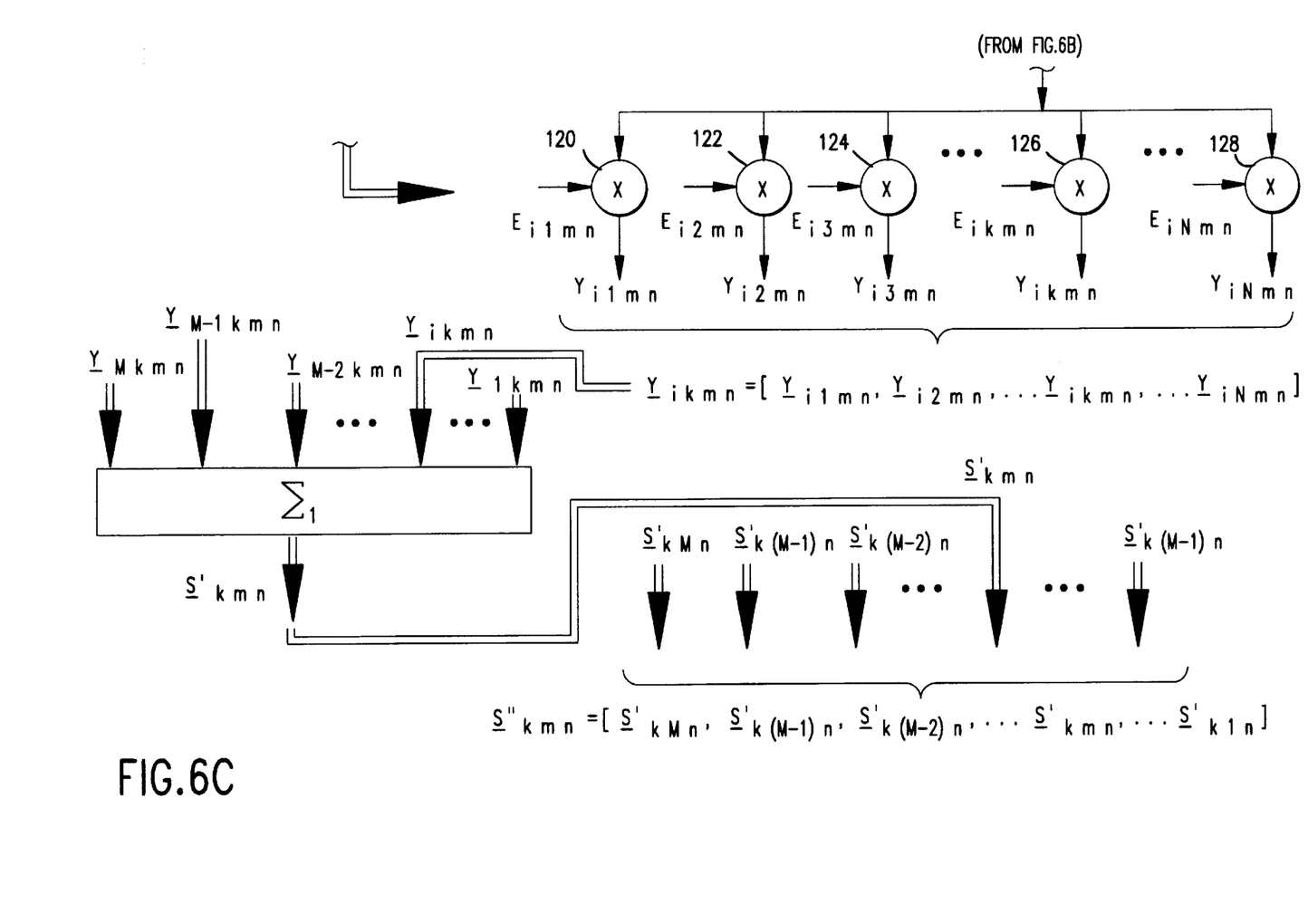

Conventional diagrams of a correlator that is matched to the resulting received waveform of Equation (4) is illustrated in FIGS. 6A, 6B and 6C. Shown is a method of compensation for the variation of Doppler shifts across the bandwidth of the waveform and compensation for the phase "noise" caused by shifting the frequency components back and forth from pulse to pulse. The components labeled Delay1 through DelayN-1 and Correlator1 through Correlator N are the same as in FIG. 3 and are repeated here only for clarity. The remainder of the figure is the details of Correlator n.

In FIGS. 6A, 6B and 6C, each of the N correlators are functionally identical. Correlator n 80 is shown in detail and will described. First, the M sub-pulses for the $n^{th}$ code are selected. The M sub-pulses are labeled $S_{mn}$, $S_{(M-1)n}$, ... $S_{mn}$, ... $S_{1n}$ and are selected by selecting the locations in the memory (or storage devices labeled Delay1 through DelayN-1) of the samples of the received signals that are received at a time, $\tau_p$, apart. $\tau_p$ is the sub-pulse width. This can be thought of functionally as taking the output of the "delay line" 82 for the $n^{th}$ code and feeding it to shift register 84 which is represented in FIG. 6B as M-1 cascaded "delay lines" 86, 88, 90 and 92. Each of these "delay lines" represent a delay of $\tau_p$. The set of components 86, 88, 90 and 92 form a part of Correlator n 80 and such a set form a part of each of the N correlators.

Each of the sub-pulses are fed to sub-pulse filters 94, 96, 98 and 100. The function of each of these filters is to select the M samples of each of the M sub-pulses of the $n^{th}$ code and to perform the appropriate Doppler correction to each sample. Then by combining (summing) the M samples, a matched filter is formed that is matched to the time-delayed and Doppler-shifted return from each sub-pulse for Doppler shifts of 0, 1/NT, 2/NT, ... (N-1)/NT. The sub-pulse filter 102 for the $m^{th}$ sub-pulse of the nth code is shown in detail. The set of sub-pulse filters which are the components labeled Sub-pulse Filter 1 through Sub-pulse Filter M in FIG. 6B form a part of Correlator n 80 and such a set form a part of each of the N correlators.

For the $m^{th}$ sub-pulse of the $n^{th}$ code, the M samples are labeled $X_{Mmn}$, $X_{(M-1)mn}$, ... $X_{imn}$, ... $X_{1mn}$ and are selected by selecting the locations in the memory (or storage devices 86, 88, 90, 92 of the samples of the received signals that are received at a time, $\tau_p/M$, apart. $\tau_p/M$ is the sampling period (the reciprocal of the sampling frequency). This can be thought of functionally as taking the output of the "delay line" delayM-m for the $m^{th}$ sub-pulse of the $n^{th}$ code and feeding it a shift register which is represented in FIG. 6B as M-1 cascaded "delay lines" 104, 106, 108 and 110. Each of these "delay lines" represent a delay of $\tau_p/M$ and form a part of Sub-Pulse Filter m which forms a part of Correlator n 80, and such a set form a part of each of the M sub-pulse filters of each of the N correlators.

The required Doppler corrections are applied to each of these samples in the components 112, 114, 116 and 118. These sets of components form a part of Sub-Pulse Filter m which forms a part of Correlator n 80 and such a set form a part of each of the M sub-pulse filters of each of the N correlators.

Since the Doppler correction is a function of the usually unknown target Doppler shift, a Doppler filter is formed for each of the potential Dopplers up to the maximum designed unambiguous Doppler shift, 1/T. The resolution of these filters and the separation between them is 1/NT. After this sub-pulse filtering, pulse filters and pulse-to-pulse Doppler filters along with any additional Doppler processing is accomplished in the Doppler Processor of FIG. 3.

The Doppler correction is accomplished by multiplying each sample (the $i^{th}$ sample being shown in detail) by N reference signals, one for each of the Doppler filters. The N multipliers are labeled by 120, 122, 124, 126 and 128 in FIG. 6C. The N reference signals ($E_{ikmn}$ for k=1 to N) make up the reference vector, $\underline{E}_{ikmn} = [E_{ikmn}$ for k=1 to N]. The connecting double lines (=) in FIG. 6C, represent vector, matrix, or tensor signals depending on its rank and the single lines (-) represent scalars. the underlined variables in FIG. 6 and the equations herein represent vectors, matrices, and tensors. For a given i, m, and n, the $i^{th}$ reference vector for the $i^{th}$ sample of the $m^{th}$ sub-pulse of the $n^{th}$ code is $$\underline{E}_{ikmn}=[e^{-j2\pi\Phi_{kmn}T_{imn}}, \text{ for } k=1, N] \qquad (5)$$

where $$\Phi_{kmn} = L_{mn}\frac{k-1}{NT} + \frac{l_{mn}-1}{\tau_p} \qquad (6)$$

$$T_{imn}=(n-1)T+(m-1)\tau_p+(i-1)\tau_p/M \qquad (7)$$

$$L_{mn} = 1 - \frac{M-l_{mn}}{f_T\tau_p+M-1} \qquad (8)$$

As defined before $l_{mn}$ is an integer from 1 to M that is specified by the particular code. It selects the frequency of the $m^{th}$ sub-pulse of the $n^{th}$ code. The total reference tensor for the $n^{th}$ code is $$R_n=[\underline{E}_{ikmn} \text{ for } i=1 \text{ to } M, k=1 \text{ to } N, \text{ and } m=1 \text{ to } M]. \qquad (9)$$

The products of these multiplications are labeled $Y_{i1mn}$, $Y_{i2mn}$, $Y_{i3mn}$, ... $Y_{ikmn}$, ... $Y_{iNmn}$ where the $k^{th}$ product is given by $$Y_{ikmn} = e^{j2\pi(d_{mn}-L_{mn}\frac{k-1}{NT})((n-1)T+(m-1)\tau_p+(i-1)\frac{\tau_p}{M})} \qquad (10)$$

for the $i^{th}$ sample of the $m^{th}$ sub-pulse of the $n^{th}$ code. The N products make up the Doppler corrected vector for this sample and can be expressed as $$\underline{Y}_{ikmn}=[Y_{i1mn}, Y_{i2mn}, \ldots Y_{ikmn}, \ldots Y_{iNmn}] \qquad (11)$$

This vector makes up the output from the component labeled Doppler-Correction i,m,n in FIG. 6B and is combined with similar vector outputs from the Doppler correction components labeled 112, 114, 116 and 118 to form a matrix of dimension M×N. This matrix provides the input to the component labeled $\Sigma_i$ in FIG. 6C. At this point, all M samples of each of the M sub-pulses of the $n^{th}$ code have had their proper correction vector ($\underline{E}_{ikmn}$, k=1 to N) applied. The component labeled $\Sigma_i$ contains N summations (one for each of the N Doppler filters being formed) which sum the M Doppler corrected samples of the sub-pulse. This results in summation across the i dimension of the matrix, from i=1 to M for each k=1 to N.

Since the component labeled $\Sigma_i$ compressed the input matrix in its i dimension, the output from the component labeled $\Sigma_i$ in FIG. 6C is again a vector of length N. The resulting vector is labeled $\underline{S}'_{kmn}$, k=1 to N where $$\underline{S}'_{kmn} = \left[\sum_{i=1}^{M} Y_{ikmn} \text{ for } k = 1 \text{ to } N\right]. \qquad (12)$$

This vector makes up the output from the component labeled Sub-pulse Filter m in FIG. 6 and is combined with similar vector outputs from the sub-pulse filters labeled Sub-pulse Filter 1 through Sub-pulse Filter M to form a matrix of dimension M×N. At this point, each sample of all M sub-pulses of the nth code have had their proper correction vectors ($[\underline{E}_{ikmn}, k=1$ to N] for i=1 to M and m=1 to M) applied. The matrix formed by combining these vectors is labeled $S''_{kmn}$, k=1 to N and m=1 to M and is expressed as $$\underline{S}''_{kmn}=[\underline{S}'_{kMn}, \underline{S}'_{k(M-1)n}, \underline{S}'_{k(M-2)n}, \ldots \underline{S}'_{kmn}, \ldots \underline{S}'_{k1n}] \qquad (13)$$

This matrix forms the output of the component labeled Correlator n in FIG. 6A. This output is the result of correlating the input signal with time-delayed and Doppler shifted replicas of the $n^{th}$ code. Corrections have been made for variation of the Doppler shifts over the bandwidth and the phase "noise" caused by moving each frequency component forward and backwards in time from code to code (i.e. pulse to pulse). Since the corrections are a function of the Doppler shifts, N corrections were made for each sample of the input signal, one for each of the Doppler filters that will be formed in the Doppler Processor of FIG. 3. All the effects of the pulse to pulse changes in the code has been removed and remaining Doppler processing can be conventional except that weighting to control the shape of the filters is done in the frequency domain instead of the time domain as is more common. It should be emphasized again that these operations, after the Doppler corrections are made to each sample, may be performed in any order. Referring to Equation (10), it is seen that, from the characteristics of the data, the order of the summations over i, m, and n is arbitrary.

The outputs $S''_{kmn}$, k=1 to N and m=1 to M from the N Doppler compensated correlators 20, 22, 24, 26 and 28 in FIG. 3 are combined to form a data tensor of rank 3, sometimes referred to as a data cube. This is the input to the Doppler Processor illustrated functionally in FIG. 7, where the matched filtering of each pulse or code is completed along with the Doppler filtering. This is analogous to the pulse compression function of the conventional matched filter for linear frequency modulated signals or other coded waveforms. Since the correlation of the codes has been accomplished in the Doppler compensated correlators, the matched filter or pulse compression of each pulse is completed by simply coherently summing the outputs from each of the M sub-pulse filters of each of the N Doppler compensated correlators. This is accomplished in the component labeled $\Sigma_m$ in FIG. 7. The component labeled $\Sigma_m$ contains $N^2$ summations which sum across the m dimension of the data cube from m=1 to M for each k=1 to N and each n=1 to N. The result of these summations form the outputs of the Pulse Filters of FIG. 7 which are labeled $S'''_{kn}$, k=1 to N where $$\underline{S}'''_{kn} = \left[\sum_{m=1}^{M} \underline{S}''_{kmn} \text{ for } k = 1 \text{ to } N \text{ and } n = 1 \text{ to } N\right] \qquad (14)$$

Figure 7:
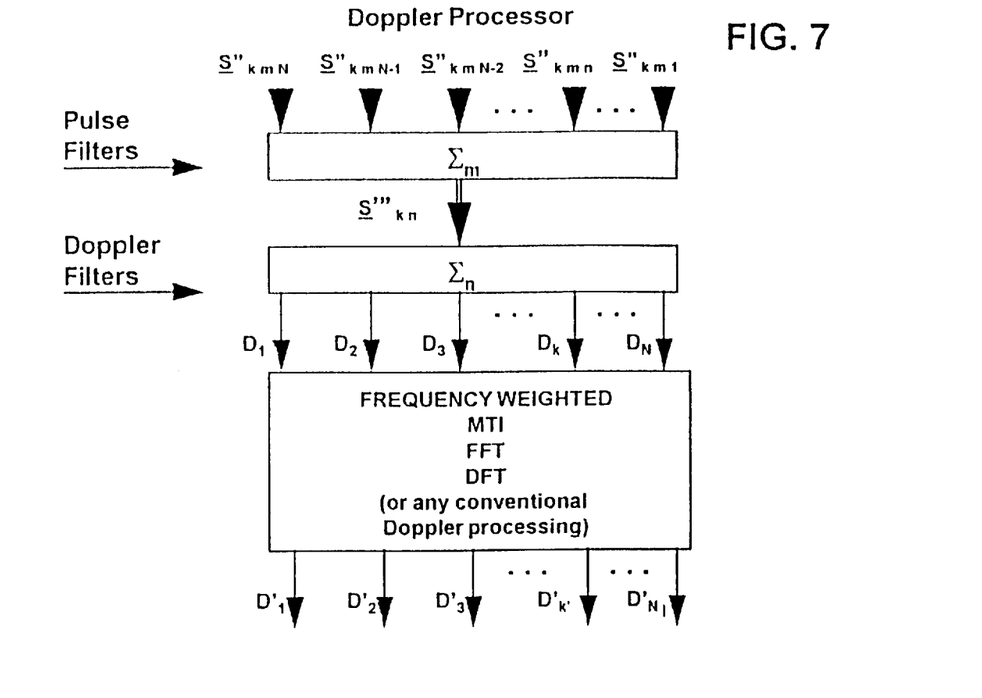
FIG. 7 is a functional diagram of an implementation of potential Doppler processing for the Doppler Processor shown in FIG. 3.

The tensor $S''_{kmn}$ is reduced to a data matrix $S'''_{kn}$ at this point and each pulse has been decoded and compressed in range. The range resolution is $c\tau_p/2M$ where $\tau_p$ is the sub-pulse width and M is the code length.

In the next step, Doppler filters are formed which include all the N pulses. This provides N Doppler frequency outputs as shown in FIG. 7 and labeled $D_1, D_2, D_3, \ldots D_k, \ldots D_N$. The component labeled $\Sigma_n$ contains N summations which sum across the n dimension of the data matrix, from n=1 to N for each k=1 to N. The result of these summations form the outputs of the Doppler Filters of FIG. 7 labeled $D_k$, k=1 to N where $$D_k = \sum_{n=1}^{N} \underline{S}'''_{kn} \text{ for } k = 1 \text{ to } N \qquad (15)$$

The value for the Doppler shift at the center of this filter is $D_k=(k-11)/NT$ and the corresponding target radial velocity is $$V_R=(C\tau_p/2)D_k/(f_T\tau_p+M-1) \qquad (16)$$

since the Doppler shift corresponds to the Doppler shift of the highest frequency component of the code, $f_T+(M-1)/\tau_P$. The Doppler shifts of the other frequency components were translated to the Doppler shift of the highest frequency component by the parameter $L_{mn}$ during the correlations, see Equation (8). The expression for the target radial velocity can be quickly derived using Equation (2) and the fact that the Doppler shift $d_{mn}=2 V_r/C f_{mn}$. Therefore $d_{mn}=2V_R/C(f_T+(1_{mn}-1)/\tau_P)$ and similarly $D_k=2 V_R/C(f_T+(M-1)/\tau_P)$. Which can be solved for $V_R$ leading to Equation (16). Furthermore these two equations illustrate the expression for $L_{mn}$, Equation (8), $$d_{mn}/D_k=(f_T+(1_{mn}-1)/\tau_P)/(f_T+(M-1)/\tau_P)=(f_T\tau_P+1_{mn}-1)/(f_T\tau_P+M-1)=(f_T\tau_P+1_{mn}-1+(M-1)-(M-1))/(f_T\tau_P+M-1)=1-(M-1_{mn})/(f_T\tau_P+M-1)=L_{mn}$$

The outputs from the Doppler Filters of FIG. 7 can be further processed for more Doppler resolution by simply collecting these outputs until the desired number, such as $N_I$, is obtained. The succeeding Doppler processing would be conventional Doppler processors such as MTI, FFT, etc. as shown in FIG. 7 since the effects of the pulse to pulse coding have been removed at this point.

In summary, after Doppler compensation, the processing simply consists of coherently summing the data described by Equation (10). Referring to Equation (10), if $d_{mn}$ equals $L_{mn}(k-1)/NT$, then the summation over the M samples of the M sub-pulses of the N pulses gives a normalized amplitude of $M^2N$ as a matched filter should.

For many applications using a pulse compression waveform and pulse Doppler processing, it is important to control the range sidelobes of the pulse compression filter and the Doppler sidelobes of the Doppler filters. This is usually done by applying a "window" function to the samples of the received signals in range for the pulse compression matched filter and a "window" function to the samples of the received signals from pulse to pulse for the pulse Doppler processing filters.

Figure 8:
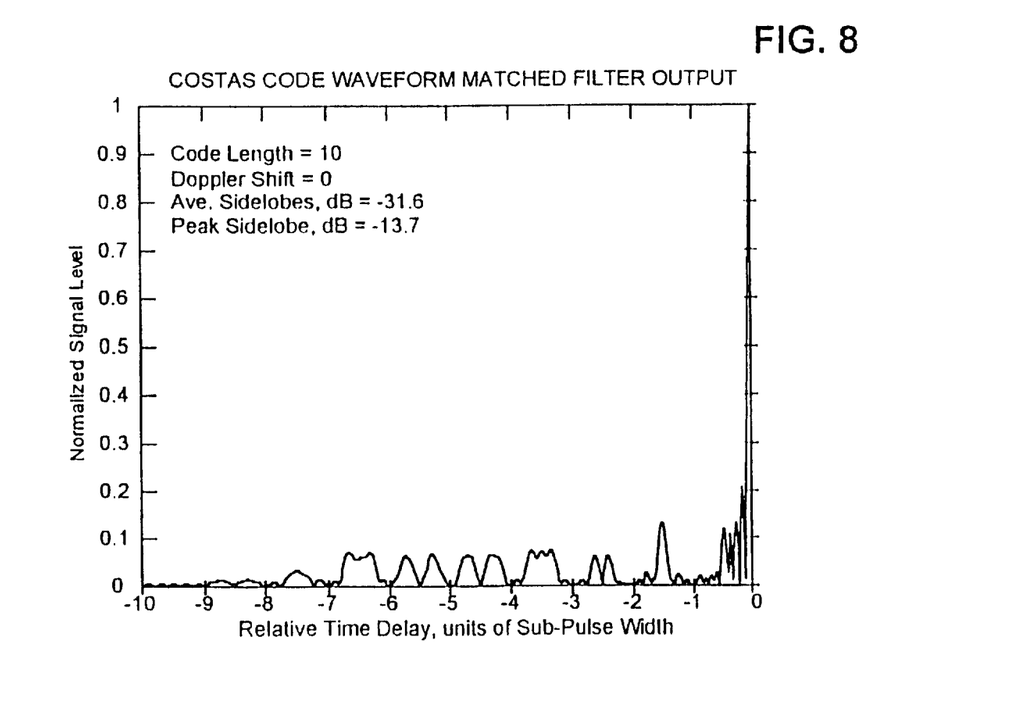
FIG. 8 is a graph of a response of a filter matched to the 10 element Costas coded waveform specified by the sequence of Equation 17.

For this invention, the "window" function is applied to the pulse compression filter by applying weights representing the chosen "window" function to the sub-pulses of each of the codes which are the inputs to the component labled $\Sigma_m$ in FIG. 7. The weights are applied in an order determined by the magnitude of the frequency of the sub-pulse and not in the order determined by the time of the sub-pulse. This is usually referred to as "frequency" weighting and is unique to this invention in that the sequence of weighting in time is determined by the specific code of that pulse which, in turn, determines the order of the appearance of the frequencies in time. For example, if the $n^{th}$ pulse is a 10 element Costas code described by the sequence $$1_{mn}=[1\ 2\ 4\ 8\ 5\ 10\ 9\ 7\ 3\ 6] \quad (17)$$

which results in the sub-pulses of the coded pulse having frequencies as determined by Equation (2). The matched filter (or autocorrelation) response to this waveform is shown in FIG. 8 from the time the code first begins to enter the filter, labeled $-10$ sub-pulses on the time axis, until the time that it is completely in the filter, labeled 0 sub-pulses on the time axis. Continuing along the time axis, which is not plotted, would be the mirror image of this curve as the waveform exits the matched filter. Therefore, there is only one peak and that peak occurs when the time delay between the waveform and the response of the matched filter is 0.

The sidelobe region is the region outside the single peak which is referred to as the mainlobe. The width of the mainlobe is given by the total pulsewidth, $M\tau_p$, divided by the square of the code length, $M^2$. This narrow mainlobe response results in the expression "pulse compression". Therefore, the "compressed" pulsewidth is $\tau_p/M$, or $\tau_p/10$ in this example.

It is desirable to minimize the response of the filter in the sidelobe region. The sidelobe region in this example extends from $-10\ \tau p$ to $-0.1\tau_p$. The nominal sidelobe level for the codes is determined by the length of the code, M. Although only one code is represented in FIG. 8, a sequence of N codes are used with this invention resulting in the sidelobes being reduced by another factor of $1/N$. It is seen from FIG. 8 that the level of the sidelobes relative to the peak of the mainlobe is nominally 0.1 as determined by the code length of 10. However it is a characteristic of these codes that when the time delay between the waveform and the response of the filter is less than one sub-pulse width ($-1$ to 0 in FIG. 8), the filter response is a sinc(x) function which results in a peak sidelobe level of $-13.7$ dB regardless of the particular code of a set of Costas codes or regardless of the length of the code. The control of the sidelobes in this region can be accomplished in two ways. The first requires the application of a "window" function to the sub-pulses and the second applies a modulation to the CW sub-pulses.

The window function reduces the sidelobes in this region, but a small signal-to-noise ratio (S/N) loss results since the filter becomes slightly mismatched. To illustrate, a Chebychev window function selected to give $-40$ dB sidelobes will be used. The resulting weights are $$w_{cheb}=[0.1175\ 0.3063\ 0.5690\ 0.8325\ 1.0\ 1.0\ 0.8325\ 0.5690\ 0.3063\ 0.1175] \quad (18)$$

These weights must be applied to the sub-pulses in the order of the frequency of the sub-pulses. therefore, using Equation (17), the order that these weights are applied to the received signals are $$a_{mn}=[0.1175\ 0.3063\ 0.8325\ 0.5690\ 1.0\ 0.1175\ 0.3063\ 0.8325\ 0.5690\ 1.0] \quad (19)$$

Figure 9:
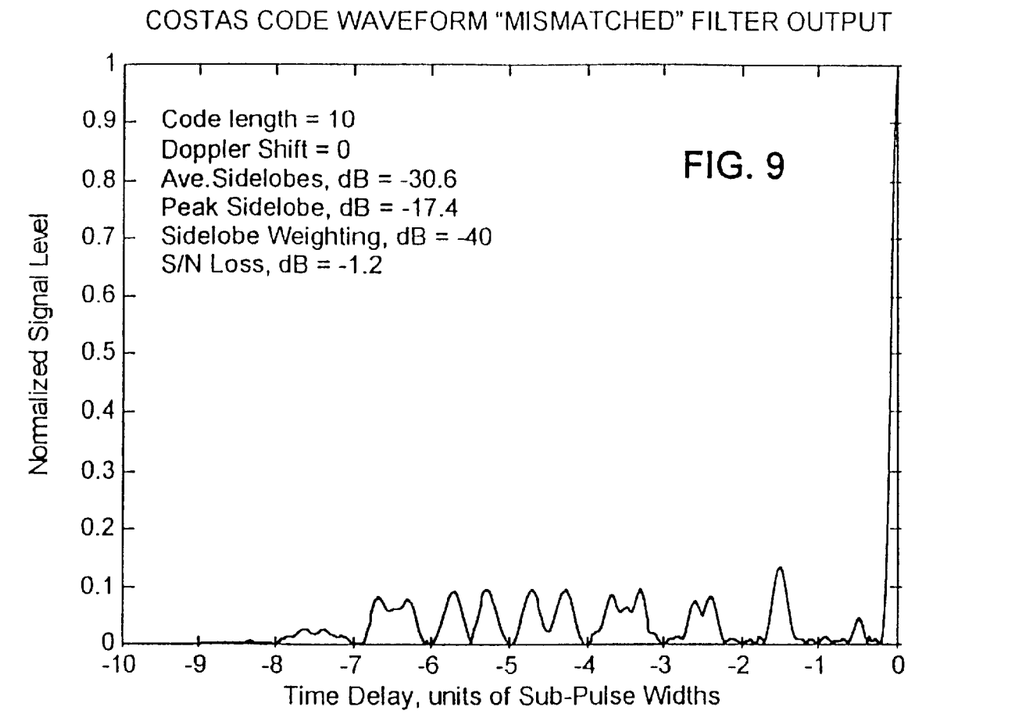
FIG. 9 is a graph of a response of a "mismatched" filter to the 10 element Costas coded waveform specified by the sequence of Equation 17, wherein the weighting function is Equation 19.

These are the M amplitude weights that would be applied to the M sub-pulses of the $n^{th}$ code, or pulse. The results of applying these weights to the input signals is shown in FIG. 9. The "near-in" sidelobes in the region of time delay less than one sub-pulse width has been significantly reduced. The "far-out" sidelobes outside this region have not been affected significantly. The width of the mainlobe has increased slightly, and a 1.2 dB S/N loss has been incurred.

A similar "window" function is applied to the input signals from pulse to pulse in a conventional way to control the sidelobes of the Doppler filters. The Doppler filters are formed in the component labeled $\Sigma_n$ in FIG. 7 which include all the N pulses. This provides N Doppler frequency outputs as shown in FIG. 7 and labeled $D_1, D_2, D_3, \ldots D_k, \ldots D_N$. The component labeled $\Sigma_n$ contains N summations which sum across the n dimension of the data matrix, from n=1 to N for each k=1 to N. This summation may also be a weighted summation. This is a conventional, well known, technique and is not unique to this invention.

To prevent an increase in the number of multiplies applied to the input signal samples, a single set of amplitude weights are defined $$w_{mn}=a_{mn}b_n \quad (20)$$

where $b_n$ is the weights applied to the N pulses of the waveform to control the Doppler sidelobes. These weights are combined with the reference signals of Equation (5) and applied to Doppler Correction components of FIG. 6 as before. With the weighting function included, the reference signals of Equation (5) become $$E_{ikmn} = [w_{mn} \, e^{-j2\pi\Phi_{kmn}T_{imn}}, \text{ for } k=1, N] \qquad (21)$$

The second method of reducing the sidelobes occuring in the region of the auto-correlation function with less than one sub-pulse width relative delay is to apply a modulation to the sub-pulses. The modulation itself must have an autocorrelation function with a single peak at zero delay and low peak sidelobes. Properly selected binary phase codes meet this criterion. Advantages of phase coding the sub-pulses include: (1) It increases the time-bandwidth by a factor equal to the phase code length, $M_p$, and therefore increases the range resolution of the radar by the same factor. (2) It reduces the sidelobes near the mainlobe without the use of a window function and the associated loss in S/N. (3) It increases the time bandwidth only by a factor equal to the code length and not by a factor equal to the square of the code length as is the case for frequency codes. For a given time-bandwidth, then, a longer frequency code can be used which results in both lower overall sidelobes and more codes. (4) It allows more orthogonal codes to be generated which in turn allows a longer sequence of codes which will further reduce the cross-correlations of the sequence of codes.

Figure 10:
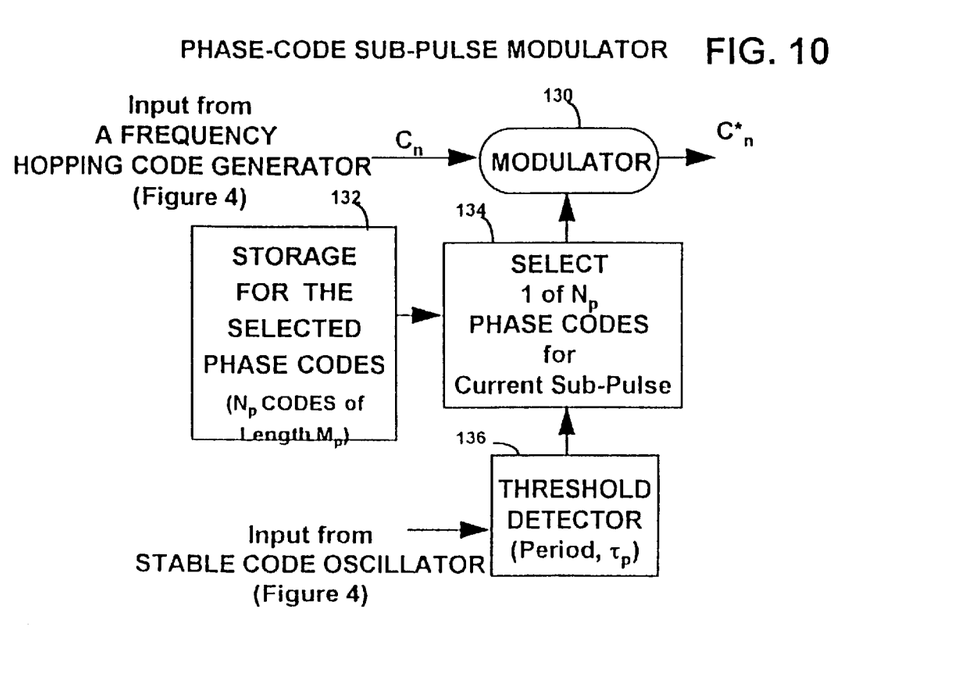
FIG. 10 is a functional diagram of an implementation of a phase-code sub-pulse modulator.

A functional diagram of an implementation of a phase-code sub-pulse modulator is shown in FIG. 10. A set of $N_p$ selected phase codes of length $M_p$ is stored in memory 132 in FIG. 10. The selected frequency code, $C_n$, for each pulse is sent through the modulator 130 where the selected phase code for each sub-pulse modulates each sub-pulse of the frequency code. The phase code for each sub-pulse is selected by the component 134 of FIG. 10. The signal for 134 to advance to the next phase code is a trigger generated by a threshold detector 136 with the output from the stable code oscillator 34 as its input. The threshold detector 134 generates the desired trigger to change phase codes each time interval, $\tau_p$.

The bandwidth of the sub-pulses becomes $M_p/\tau_p$ for a phase code length with $M_p$ elements. This means that the frequency separation between elements (sub-pulses) of the frequency hopping codes will also be $M_p/\tau_p$ and the total bandwidth will be increased by a factor of $M_p$ resulting in an increase in range resolution by the factor of $M_p$.

This concept is illustrated by the following example. A 10 element Costas code is used for the illustrated pulse of an assumed sequence; this code is defined by $$1_{mn} = [4 \; 8 \; 5 \; 10 \; 9 \; 7 \; 3 \; 6 \; 1 \; 2] \qquad (22)$$

and two 13 element Barker binary phase codes are alternately used to modulate the sub-pulses of each pulse. The Barker codes are defined by $$\Phi_1 = [1 \; 1 \; 1 \; 1 \; 1 \; -1 \; -1 \; 1 \; 1 \; -1 \; 1 \; -1 \; 1] \qquad (23)$$

and $$\Phi_2 = [1 \; -1 \; 1 \; -1 \; 1 \; 1 \; -1 \; -1 \; 1 \; 1 \; 1 \; 1 \; 1] \qquad (24)$$

where +1 represents 0° phase shift and −1 represents 180° phase shift.

Figure 11:
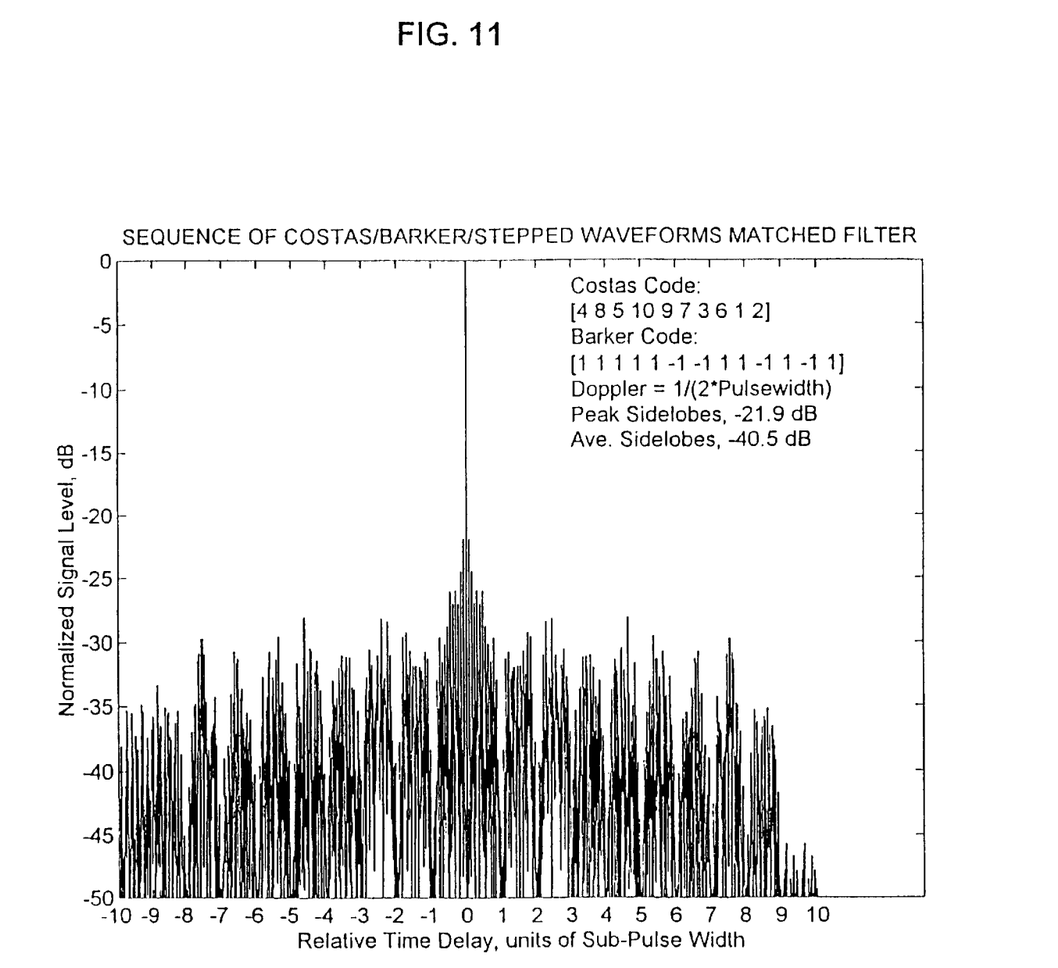
FIG. 11 is a graph of a response of a filter matched to the 10 element Costas coded waveform specified by the sequence of Equation 22 with the sub-pulses coded with the phase codes specified by Equations 23 and 24.

The matched filter (or autocorrelation) response to this waveform is shown in FIG. 11 from the time the code first begins to enter the filter, labeled −10 sub-pulses on the time axis, until the time that it is completely in the filter, labeled 0 sub-pulses on the time axis. Continuing along the time axis is the mirror image of this curve as the waveform exits the matched filter. Therefore, there is only one peak and that peak occurs when the time delay between the waveform and the response of the matched filter is 0. Comparing FIG. 11 with FIG. 8, the peak sidelobe near the single peak has been reduced from −13.7 dB to −21.9 dB and the average sidelobes are reduced from −31.6 dB to −40.5 dB. The narrower peak, higher range resolution is also illustrated.

Figure 12:
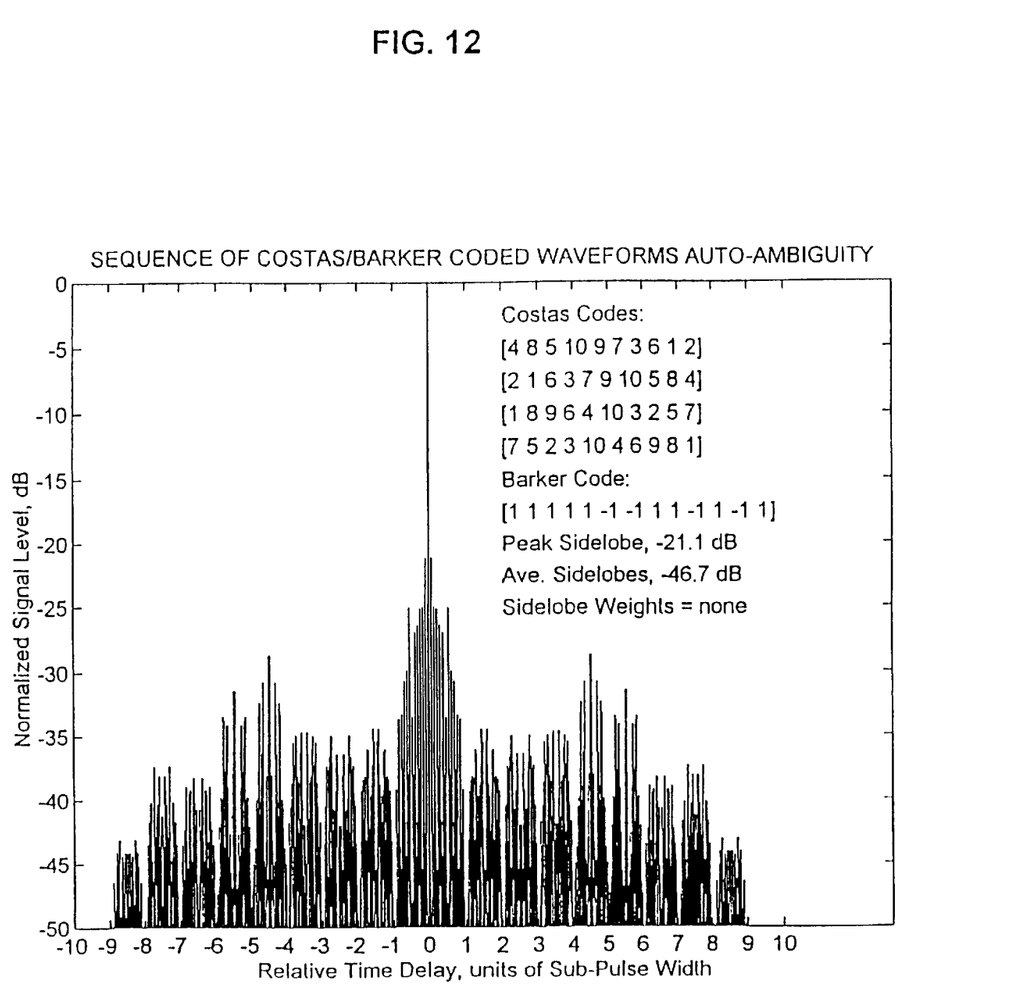
FIG. 12 is a graph of a response of a filter matched to a sequence of four 10 element Costas coded waveforms with the sub-pulses of each code coded with the phase codes specified by Equations 23 and 24.

The matched filter (or autocorrelation) response to a sequence of four such Costas and Barker coded waveforms is shown in FIG. 12. Comparing FIG. 12 with FIG. 11, the peak sidelobe near the single peak has not been reduced significantly since it is controlled by the autocorrelation of the 13 element Barker code. However, the average sidelobes are reduced from −40.5 dB to −46.7 dB. This illustrates the coherent summation of the peaks of the autocorrelation function of the sequence of codes and the incoherent summation of the sidelobes.

The performance of this invention is fundamentally tied to the time-bandwidth product of the waveform in several ways. Since the frequency separation between the subpulses is $M_p/\tau_p$ when the sub-pulses have a binary phase code of length $M_p$ applied and there are M subpulses (i.e. the code length is M), then the waveform's bandwidth is $M_p M/\tau_p$. The width (i.e. time duration) of the subpulses is $\tau_p$; therefore M subpulses results in a total pulsewidth of $M\tau_p$. The time-bandwidth product, then, is $M_p M^2$. In several ways the larger the time-bandwidth product, $M_p M^2$ (or the longer the code length, M), the greater the benefits of this waveform/signal-processing concept.

For example, the energy level in the sidelobes of the auto-correlation function is approximately the reciprocal of the time-bandwidth product, $1/M_p M^2$. The lower these sidelobes the easier to locate the peak and therefore to detect and locate the target. Additionally, it improves the ability to detect small targets in the vicinity of a large target.

Furthermore, the energy level in the peaks of the cross-correlation function is approximately two times the reciprocal of the time-bandwidth product, $2/M_p M^2$. The lower these peaks, the easier to differentiate between the returns from each transmitted pulse. Therefore, this represents the level of the suppression of the range ambiguities.

Additionally, the number of frequency codes in a set meeting the five properties described above is determined from the length of the code, M, which as shown before is the square root of the time-bandwidth product when no phase coding of the sub-pulses is employed. For example, a total pulse-length of $M\tau_p = 120$ ms and a bandwidth of $M/\tau_p = 30$ MHz gives a time-bandwidth of $M^2 = 3600$ and a code length of M=60. Using the method described previously, M=60 is an acceptable code length since M+1=61 must be a prime number and the number of codes when only using the Welch construction is $N_c = 960$. The number of codes with good cross-correlation characteristics is 16. When a 13 element Barker code is embedded in the 60 element Costas code as described above, the resulting number of codes with good cross-corellation characteristics becomes at least 13×16= 208. This number could be increased by another factor of 13 for some applications. The existence of a large number of codes allows a large sub-set of these codes to be used in a burst with no range ambiguities and equally important allows multiple radars to operate in the same vicinity and in the same frequency band by using different sub-sets of the set of codes. In this example, if it is desired to have the first range ambiguity to be 10 times the interpulse period, then 10 codes would have to be used which would conceivably allow 20 radars to operate nearby with minimal interference.

Furthermore, for a given time-bandwidth product, $M_p M^2$, there are advantages to achieving this with more bandwidth and less time. It results in less eclipsing of targets whose returns arrive at the radar when the transmitter is on, and it also leads to greater range resolution which is important for tracking in a dense target scenario and for target classification and raid count; and for SAR applications, this results in higher resolution images.

As can be appreciated by one of ordinary skill in the art, this invention can be realized in a number of embodiments of which the disclosed embodiments are only several of many equivalent alternatives

What is claimed:

1. A radar system for determining the range and velocity of one or more targets, comprising:
    a code device for producing at least one series of N radio frequency pulses directed at the targets, each of said pulses separated from adjacent pulses by a time T, each of said pulses containing a plurality of M contiguous subpulses, each of said M subpulses in each of said pulses exhibiting a different frequency than the remaining subpulses in that particular pulse, and further wherein the order of appearance of said M subpulses in each of said pulses is unique with respect to the remaining pulses in said series of N pulses;
    a transmitter connected to said code device for transmitting said at least one series of N pulses directed at the targets; and
    a receiver for receiving said at least one series of N pulses reflected from the targets,
        said receiver including a plurality of delay devices, each of said delay devices storing one of said N pulses for a time T;
        a plurality of correlators, each of said correlators connected to either an input of said receiver or one of said delay devices, each of said correlators provided with a replica of one of said N pulses, each of said correlators producing either an auto-correlation or cross-correlation output; and
        a Doppler processor for processing said auto-correlation and said cross-correlation outputs of said plurality of correlators to produce both range and velocity measurements of the targets without range ambiguities and Doppler ambiguities.

2. The system in accordance with claim 1 wherein said frequencies of each of said subpulses are separated by $1/\tau_p$, wherein $\tau_p$ is the pulse width of each of said subpulses.

3. The system in accordance with claim 1, wherein said Doppler processor includes a signal filtering means for weighting said series of N pulses in its entirety from pulse to pulse to reduce Doppler side lobes produced in said Doppler processor.

4. The system in accordance with claim 2 wherein said correlators includes a sub-pulse filtering means for weighting the frequencies of said sub-pulses to reduce range sidelobes produced in said correlators.

5. The system in accordance with claim 3 wherein said correlators includes a sub-pulse filtering means for weighting the frequencies of said sub-pulses to reduce range sidelobes produced in said correlators.

6. The system in accordance with claim 1, wherein said frequencies of said subpulses include binary phase codes.

7. The system in accordance with claim 6 wherein said receiver is provided in a synthetic aperture radar.

8. The system in accordance with claim 1, wherein said frequencies of said subpulses include polyphase codes.

9. The system in accordance with claim 3 wherein said receiver is provided in a synthetic aperture radar.

10. The system in accordance with claim 4 wherein said receiver is provided in a synthetic aperture radar.

11. The system in accordance with claim 1, wherein each of said delay devices is an analog delay line.

12. The system in accordance with claim 1, wherein each of said delay devices are digital storage devices.

13. The system in accordance with claim 1 wherein said code device includes a Costas code waveform generator and a timing device for selecting from a set of potential Costas codes, said timing device changing the Costas code for each of said N pulses.

14. The system in accordance with claim 13, wherein said frequencies of said subpulses include binary phase codes.

15. The system in accordance with claim 14 wherein said receiver is provided in a synthetic aperture radar.

16. The system in accordance with claim 1, wherein each of said N pulses is provided with the same number and frequency of subpulses as the other pulses.

17. A sonar system for determining the range and velocity of one or more targets, comprising:
    a code device for producing at least one series of N sonar pulses directed at the targets, each of said pulses separated from adjacent pulses by a time T, each of said pulses containing a plurality of M contiguous subpulses, each of said M subpulses in each of said pulses exhibiting a different frequency than the remaining subpulses in that particular pulse, and further wherein the order of appearance of said M subpulses in each of said pulses is unique with respect to the remaining pulses in said series of N pulses;
    a transmitter connected to said code device for transmitting said at least one series of N pulses directed at the targets;
    a receiver for receiving said at least one series of N pulses reflected from the targets, a plurality of delay devices, each of said delay devices storing one of said N pulses for a time T;
    a plurality of correlators, each of said correlators connected to either said receiver or one of said delay devices, each of said correlators provided with a replica of one of said N pulses, each of said correlators producing either an auto-correlation or cross-correlation output; and
    a Doppler processor for processing said auto-correlation and said cross-correlation outputs of said plurality of correlators to produce both range and velocity measurements of the targets without range ambiguities and Doppler ambiguities.

18. The system we accordance with claim 17 wherein said frequencies of each of said subpulses are separated by $1/\tau_p$ wherein $\tau_p$ is the pulse width of each of said subpulses.

19. The system in accordance with claim 17, wherein said Doppler processor includes a signal filtering means for weighting said series of N pulses in its entirety from pulse to pulse to reduce Doppler side lobes produced in said Doppler processor.

20. The system in accordance with claim 18 wherein said correlators include a sub-pulse filtering means for weighting the frequencies of said sub-pulses to reduce range side lobes produced in said correlators.

21. The system in accordance with claim 19 wherein said correlators include a sub-pulse filtering means for weighting the frequencies of said sub-pulses to reduce range side lobes produced in said correlators.

22. The system in accordance with claim 17, wherein said frequencies of said subpulses include binary phase codes.

23. The system in accordance with claim 22 wherein said receiver is provided in a synthetic aperture sonar.

24. The system in accordance with claim 17, wherein said frequencies of said subpulses include polyphase codes.

25. The system in accordance with claim 19 wherein said receiver is provided in a synthetic aperture sonar.

26. The system in accordance with claim 20 wherein said receiver is provided in a synthetic aperture sonar.

27. The system in accordance with claim 17, wherein each of said delay devices is an analog delay line.

28. The system in accordance with claim 17, wherein each of said delay devices are digital storage devices.

29. The system in accordance with claim 17 wherein said code device includes a Costas code waveform generator and a timing device for selecting from a set of potential Costas codes, said timing device changing the Costas code for each of said N pulses.

30. The system in accordance with claim 29, wherein said frequencies of said subpulses include binary phase codes.

31. The system in accordance with claim 30 wherein said receiver is provided in a synthetic aperture sonar.

32. The system in accordance with claim 17, wherein each of said N pulses is provided with the same number of frequency of subpulses as the other pulses.

33. A method for determining the range and velocity of one or more targets utilizing radar comprising:

producing at least one series of N radio frequency pulses directed at the targets, each of said pulses separated from adjacent pulses by a time T, each of said pulses containing a plurality of M contiguous subpulses, each of said M subpulses in each of said pulses exhibiting a different frequency than the remaining subpulses in that particular pulse, and further wherein, the order of appearance of said M subpulses in each of said pulses is unique with respect to the remaining pulses in said series of N pulses;

transmitting said at least one series of N radio frequency pulses directed at the targets;

receiving said at least one series of N pulses reflected from the targets;

storing each of said N pulses for a time T in a plurality of delay devices;

sending each of said N pulses from a respective delay device to individual correlators each of which is provided with a replica of one of said N pulses;

producing from each of said correlators an auto-correlations output or a cross-correlation output;

processing in a Doppler processor said auto-correlation outputs and said cross-correlation outputs to produce both range and velocity measurements of the targets without range ambiguities and Doppler ambiguities.

34. The method in accordance with claim 33 wherein the frequencies of each of said subpulses are separated by $1/\tau_p$ wherein $\tau_p$ is the pulse width of each of said subpulses.

35. The method in accordance with claim 33 further including the step of:

weighting said series of N pulses in its entirety from pulse to pulse to reduce Doppler sidelobes produced in said Doppler processor.

36. The system in accordance with claims 34 further including the step of:

weighting the frequencies of said sub-pulses to reduce range sidelobes produced by said correlators.

37. The system in accordance with claim 36 wherein said receiver is provided in a synthetic aperture radar.

38. The system in accordance with claim 35 further including the step of:

weighting the frequencies of said sub-pulses to reduce range sidelobes produced by said correlators.

39. The system in accordance with claim 38 wherein said receiver is provided in a synthetic aperture radar.

40. A method for determining the range and velocity of one or more target utilizing sonar comprising:

producing at least one series of N sonar pulses directed at the targets, each of said pulses separated from adjacent pulses by a time T, each of said pulses containing a plurality of M contiguous subpulses, each of said M subpulses in each of said pulses exhibiting a different frequency than the remaining subpulses in that particular pulse, and further wherein, the order of appearance of said M subpulses in each of said pulses is unique with respect to the remaining pulses in said series of N pulses;

transmitting said at least one series of N radio frequency pulses directed at the targets;

receiving said at least one series of N pulses reflected from the targets;

storing each of said N pulses for a time T in a plurality of delay devices;

sending each of said N pulses from a respective delay device to individual correlators each of which is provided with a replica of one of said N pulses;

producing from each of said correlators an auto-correlations output or a cross-correlation output;

processing in a Doppler processor said auto-correlation outputs and said cross-correlation outputs to produce both range and velocity measurements of the targets without range ambiguities and Doppler ambiguities.

41. The method in accordance with claim 40 wherein the frequencies of each of said subpulses are separated by $1/\tau_p$ wherein $\tau_p$ is the pulse width of each of said subpulses.

42. The method in accordance with claim 40 further including the step of:

weighting said series of N pulses in its entirety from pulse to pulse to reduce Doppler sidelobes produced in said Doppler processor.

43. The system in accordance with claim 41 further including the step of:

weighting the frequencies of said sub-pulses to reduce range sidelobes produced by said correlators.

44. The system in accordance with claim 43 wherein said receiver is provided in a synthetic aperture sonar.

45. The system in accordance with claims 42 further including the step of:

weighting the frequencies of said sub-pulses to reduce range sidelobes produced by said correlators.

46. The system in accordance with claim 45 wherein said receiver is provided in a synthetic aperture sonar.

* * * * *